Patented Sept. 23, 1924.

1,509,688

UNITED STATES PATENT OFFICE.

CHARLES L. PARSONS, OF HAWKINSVILLE, GEORGIA, AND HARRY P. BASSETT, OF PHILADELPHIA, PENNSYLVANIA; SAID BASSETT ASSIGNOR TO SAID PARSONS.

RECOVERY OF ARSENIC.

No Drawing. Application filed August 13, 1923. Serial No. 657,265.

*To all whom it may concern:*

Be it known that we, CHARLES L. PARSONS and HARRY P. BASSETT, citizens of the United States, and residents of Hawkinsville, Georgia, and Philadelphia, Pennsylvania, respectively, have invented certain new and useful Improvements in the Recovery of Arsenic, of which the following is a specification.

This invention relates to the recovery of arsenic; and it comprises methods of recovering arsenic from metallurgical dusts or fumes of oxidized nature wherein such dusts or fumes are leached with hot water and with soda solution of sufficient alkalinity to correspond to about a disodium compound of the arsenic to be extracted thereby and give a substantially neutral extract; all as more fully hereinafter set forth and as claimed.

Smelting, roasting and various other metallurgical operations give arseniferous dusts and fumes which it is desirable to treat for the recovery of the arsenic, as well as of the valuable metals contained therein. Various dry methods of effecting this recovery have been proposed and some are in use; all depending on the relative volatility of the arsenic compounds. None gives a pure product, either as a residue or as a sublimate, in a single treatment and ordinarily three to five sublimations are necessary to obtain a commercially pure arsenic preparation and, conversely, to free the residual metal values of arsenic to a sufficient extent. These metal values may include silver, gold, copper, lead, zinc, etc. In one typical process now in use, stack gases from a smelter handling arseniferous ores are sent through an electrical "fume separator" of the Cottrell type, giving precipitated dust containing about 20 per cent $As_2O_3$. This goes to a reverberatory furnace where it is matted. The furnace gases carry arsenic and are again electrically precipitated. Generally two fume collectors in series are used; and in this case the dusts collected may run about 70 and 85 per cent, respectively. These dusts are then roasted in a special roaster, the fumes being again collected. The product may now be a 95 per cent material. This is sublimed to obtain commercially pure "white arsenic" of, say, 99.5 per cent purity. The various residues obtained in the various operations go backward through the process. The total recovery of arsenic in this process is rarely more than 60 per cent of that originally present in the ore.

It is the purpose of the present invention to provide a simple and economical method of treating these dusts and fumes, directly giving pure arsenic products as well as residues sufficiently free of arsenic to obviate the necessity of a special retreatment to remove it.

The various "fumes" and "dusts" referred to and arising from smelters, roasters, etc., are of highly variable composition and may, as stated, contain many other metals in addition to arsenic. In part, they are true dusts; finely divided particles of solid matters entrained and carried forward by the gases and in part, they are composed of fume-condensed vaporized matters. Sometimes the arsenic is present in elemental form; and in these cases, the dusts will generally burn in contact with air. More frequently, the arsenic is present in oxidized form; as $As_2O_3$ and $As_2O_5$, with the former generally predominating. The amount of $As_2O_5$ may be negligibly small unless special roasting treatments are used.

While it is the general impression that in these dusts much of the arsenic is in combination with the various bases present to form refractory compositions, needing drastic treatments for decomposition, we have found that this is not so; or, at least, quite frequently it is not so; as in the Cottrell type electrical precipitator dusts, and particularly the richer dusts, such as 70–85 per cent material referred to. Such dusts are sometimes free, or substantially free of bases in combination with arsenic or of bodies capable of reacting with arsenic oxids to keep such oxids from going into solution with water; and very often contain so little as to permit extraction of substantial amounts of arsenic by hot water alone. We have found by examination of many fumes and dusts, that quite often the arsenic is present in discrete particles simply intermingled with the other materials present and not in combination with them. Sometimes the arsenic appears to be fumiform and the other materials more in the nature of dust; the collected material is then really a mechanical mixture of arsenical fume and dust.

In the case of dusts of the character just referred to, we find that we can sometimes reduce the arsenic content to as low as 1 per cent or thereabouts by simply extracting with hot water, say, at 80° to 100° C. With the arsenic content reduced to 1 per cent or thereabouts, the residues are amenable to ordinary metallurgical treatments; such a content being generally negligible. The hot water extract contains the arsenic as arsenious and arsenic oxids; mainly the former. Prior to the extraction the dust may, or may not, be given a light oxidizing roast to increase the proportion of $As_2O_5$. The extract may be cooled to deposit $As_2O_3$; or it may be simply evaporated to obtain a commercially pure material. Or it may first be neutralized with soda, if sodium salts are desired.

With fumes and dusts containing arsenic in the elemental state, the material may require a roast prior to extraction. If enough of the element is present, it may fire and oxidize on exposure to air; in which event little, if any, additional heat is necessary for the roasting. Elemental arsenic in a dust so oxidized gives water-soluble oxids of arsenic; the bases present not combining with it to give arsenites.

Where the dusts also contain arsenic in a form insoluble in hot water, a further treatment with an alkaline solution may be desirable in order to reduce the arsenic in the residue to the desired low point of, say, a per cent or thereabouts. Much, of course, depends on the character of the dusts. Sometimes a simple treatment with water, with or without preliminary oxidation, is all that is necessary; sometimes such a treatment is not economical; and frequently the use of the two extractions successively is advisable.

While the use of the caustic soda, or of sodium carbonate, in removing arsenic has been proposed, it has not proved successful in practice with dusts of the character described to obtain solutions of arsenic suitable for the direct manufacture of insecticides. The arsenic extracts were not pure and valuable metals occurred in them.

As we have found, much depends upon the exact character of the alkaline solution used. If the alkalinity is beyond a certain point, lead and zinc go into solution as plumbite and zincate, respectively; not only giving a solution which is hard to purify, but giving a residue impoverished in these metals. On the other hand, if the alkalinity is below a certain point, copper compounds are apt to dissolve, giving a blue or green extract. The same objections apply.

We have found that in order to obtain a pure extract and avoid loss of metal values, the alkali solution, such as a caustic soda solution, should be of such strength as to give approximately disodium salts with the arsenic present. If the proportion of alkali is so adjusted as to give this result, the extract will be found to give a reaction approximately neutral with the usual indicators (litmus, phenolphthalein, etc.). There will be no great excess of either hydrogen or hydroxylions in it. Nor will analysis show substantial amounts of copper or of lead or zinc in such an extract. One extraction with such an alkali solution is often sufficient to reduce residual arsenic below two per cent. Another extraction may however in some cases be practiced. If so, it is not necessary then to avoid excess alkalinity, since the second extract can be added to the batch of liquid used in making a first extraction.

An extract made with solution of caustic soda or of sodium carbonate may be evaporated in any of the usual appartaus to make a commercially pure solution of sodium arsenite (and arsenate). Or, and advantageously, it may after oxidation be precipitated, advantageously with caustic lime, thereby regaining caustic soda for reuse in leaching more dust. Prior to precipitation or simultaneously therewith, a little chlorin or hypochlorite may be added to oxidize $As_2O_3$ to $As_2O_5$.

While sodium carbonate (soda ash) may be used for the extracting solvent and works well, yet if lime be used for precipitating the arsenic, the regained solvent will then be a caustic soda solution.

The lime precipitate, if mainly arsenite, may be marketed or used as a raw material for the production of various well known insecticidal preparations, such as paris green, as well as of arsenious compounds generally. If it be, as it may be, mainly arsenate, it may be directly used as an insecticide or for the preparation of other arsenates.

In practical embodiments of our process, as already noted, the particular procedure depends upon the character of the dust. Presuming a dust containing a substantial proportion of arsenic in both water soluble form and water insoluble form, we customarily first extract with boiling water. Methodical extraction methods may be used. Hot saturated water solutions of arsenious oxid slowly deposit part of their arsenic as pure crystallized $As_2O_3$ on cooling; and this fact may be utilized in such methodical extraction methods. Usually, however, the oxids of arsenic are recovered by direct evaporation. After the water extraction, the amount of arsenic in the residual matters is determined and any residue of value treated with hot 10 per cent caustic soda solution in sufficient amount to correspond to disodium salts of such residual arsenic. The available alkali in the solution should be sufficient to give two atoms of Na for each atom of As present. The hot soda extract, which should be nearly neutral to test papers, is separated in any convenient way, as by settling, centrifugal action, filter pressing, etc., and the residue washed somewhat, the washings being used in making another batch of caustic liquor. The residue may be again extracted with an alkaline solution, which may be freely alkaline, that is, containing more alkali than the stated ratio; this second extract being generally used in making up a batch of caustic liquor for treating fresh dust. Any valuable metals which the alkaline solution used in this second washing may take up, because of its excess alkalinity, will then be reprecipitated and rejoin the residue.

The caustic soda extract, preferably after oxidation, is next precipitated with the correct amount of caustic lime, giving a precipitate of calcium arsenate and a solution of caustic soda, which goes back for reuse.

While we have described the present process more particularly as applied to metallurgical fumes and dusts for the recovery therefrom, on the one hand, of the arsenic compounds, and, on the other, valuable residual metals, it is of course obvious that it may be applied to fumes where the values in the residues are negligible. And the present process may also be applied to specially prepared fumes and dusts, such as those which may be obtained by roasting mispickel and other arseniferous ores and materials. In our claims we mean to refer to such specially prepared arseniferous dusts and fumes, as well as to those which are produced as a by-product in ordinary metallurgical operations.

What we claim is:—

1. In the treatment of arsenical metallurgical dusts and fumes containing water soluble arsenic compounds for the separation of arsenic from residual metal values, the process which comprises leaching the material with hot water to remove water-soluble compounds therefrom and extracting the residue with a hot solution containing alkali in about the amount required to give a di-alkali metal compound with oxids of arsenic present in such residue.

2. In the treatment of arsenical metallurgical dusts and fumes containing water soluble arsenic compounds for the separation of arsenic from residual metal values, the process which comprises leaching the material with hot water to remove water-soluble compounds therefrom and extracting the residue with a hot solution of caustic soda containing soda in about the amount required to give disodium compounds with oxids of arsenic present in such residue.

3. In the treatment of arsenical metallurgical dusts and fumes containing water soluble arsenic compounds for the separation of arsenic from residual metal values, the process which comprises leaching the material with hot water to remove water-soluble compounds therefrom, extracting the residue with a hot recovered solution of caustic soda containing soda in about the amount required to give disodium compounds with the oxids of arsenic present in such residue, precipitating the arsenic with caustic lime, separating the precipitate and returning the resultant recovered solution of caustic soda for re-use.

4. In the treatment of arsenical metallurgical dusts and fumes containing water soluble arsenic compounds for the separation of arsenic from residual metal values, the process which comprises leaching the material with hot water to remove water-soluble compounds therefrom, extracting the residue with a hot recovered solution of caustic soda containing soda in about the amount required to give disodium compounds with the oxids of arsenic present in such residue, oxidizing the solution, precipitating the arsenic with caustic lime, separating the precipitate and returning the resultant recovered solution of caustic soda for reuse.

5. In the treatment of arsenical metallurgical fumes and dusts for the separation of arsenic and residual metal values, the process which comprises extracting the material with an alkaline solution containing an alkali in about the amount required to produce a di-alkali metal compound with the oxids of arsenic present.

6. In the treatment of arsenical metallurgical fumes and dusts for the separation of arsenic and residual values, the process which comprises extracting the material with a hot caustic soda solution in such an amount and of such an alkaline strength that the resultant solution of sodium arsenic compounds leaving such material shall be substantially free of zinc, lead and copper where such metals exist in said residue.

7. In the treatment of arsenical metallurgical fumes and dust containing substantial amounts of arsenic compounds in a form soluble in water, the process of separating such arsenic from residual metal values which comprises leaching said material with hot water.

8. In the treatment of metallurgical fumes and dusts for the separation of arsenic and residual values, the process which comprises extracting the material with a hot alkaline solution of a sodium compound, the amount of such solution employed and its alkalinity being such that a substantially neutral extract results, such extract being substantially free of zinc, lead and copper where such metals exist in said residue.

In testimony whereof, we have hereunto affixed our signatures.

CHARLES L. PARSONS.
HARRY P. BASSETT.